INVENTOR
KARL BREUER
By: McGlew and Toren
ATTORNEYS

United States Patent Office 3,226,996
Patented Jan. 4, 1966

3,226,996
TRANSMISSION GEAR WHEEL AND METHOD OF MANUFACTURE
Karl Breuer, Mulheim, Ruhr, Germany, assignor to Demag Aktiengesellschaft, Duisburg, Germany
Filed Mar. 18, 1963, Ser. No. 265,997
Claims priority, application Germany, Mar. 17, 1962, D 38,395
11 Claims. (Cl. 74—421)

This invention relates in generall to transmission wheel construction and to a method of manufacturing such wheels and, in particular, to a new and useful gear wheel construction with a reinforcing structure between the outer gear ring and the gear hub providing resistance against both radial and axial stresses.

The present invention has particular application to gear wheels, particularly gear wheels of a helical type which may be subjected to considerable axial forces in addition to the radial forces which are normally encountered. The invention is also applicable, however, to pulley constructions or other power transmission wheels wherein it is desirable to have a wheel which has very excellent strength characteristics both in respect to radial and axial stresses.

Prior to the present invention, gear wheels have had undesirable characteristics, either from the standpoint of being incapable of resisting axial stresses or having means providing for axial stress resistance but preventing any flexibility of the gear wheel in radial direction. With prior art contructions, contact errors between the transmission surfaces were caused by the misalignment of the gear wheel after repeated stressing, resulting in poor contact at the tooth flanks and friction wear, pitting formation and untimely or premature breakage.

In accordance with the present invention, a gear wheel is provided which is relatively stiff in axial and radial directions but is of a construction which permits a certain yielding of the structure when subjected to forces which act in a radial direction off center from the surface of the gear rim. In accordance with a preferred construction, the gear rim is mounted adjacent the apex of a substantially triangularly-sectioned configuration which is formed as a radical extension of a hub portion, preferably by the employment of two plates which are welded to the hub portion and which join the rim of the gear by welding at or adjacent the apex thereof. The apex of the triangularly-sectioned formation of the plates is advantageously cut off, so that the support for the gear rim on the wheel hub is by structural elements which resemble a trapezoidal linkage in cross-section. The construction insures that the gear ring or rim is made rockable or tiltable about the supporting trapezoidal linkage structure.

In a preferred embodiment, two annular plates or rings are employed for forming the supporting structure between the rim and the gear ring. The plates are arranged in the form of a triangle in cross-section, with the apex extending toward the gear rim. The plates are advantageously arranged, so that the impact area, that is, the spacing between the plates at the connection point to the rim at the inner portion of the gear rim or ring is relatively small. The connection of the plates to the central hub portion of the gear wheel is made at relatively widely spaced locations. In some instances, it is desirable that the plates are connected together at their connection to the gear ring and, in some instances, it is desirable that a small annular neck piece or connecting ring be provided between the plates and the outer gear ring. The plates forming the supporting structure between the hub and the gear ring are advantageously made relatively thin. The plates, together with the hub and the gear tooth ring, advantageously form a single constructional element which may be formed integrally, such as by casting or may be formed of separate elements which may be welded together. With the construction, no reinforcing extending between the spaced plate elements is required.

In a preferred method of construction, the hub gear ring and intermediate supporting structure are advantageously made of separate elements. The supporting structure advantageously comprises two plates which are welded at spaced axial locations on the hub portion and are arranged to converge inwardly toward their peripheries and are welded at their outer ends to the inner surface of the gear ring.

In one method of construction, the gear wheel is advantageously made up of an outer bandage and an inner rim. The bandage is first heat-shrunk onto the rim and the rim, in turn, is heat-shrunk onto an annular web member. The resultant structure is then welded to the supporting plate elements which are welded to the hub.

Accordingly, it is an object of this invention to provide an improved power transmisison wheel construction.

A further object of the invention is to provide a gear wheel construction which includes an outer rim portion and a central hub portion with a substantially triangularly-sectioned supporting structure interconnecting the hub and rim portions, the connection of the supporting structure to the rim being at relatively closely spaced locations, and the connection of the supporting structure to the hub being at relatively widely spaced location.

A further object of the invention is to provide a gear wheel construction which includes an outer gear ring, an inner hub portion, and a pair of plate elements which are integrally connected to the hub at axially spaced locations and converge in a radially outwardly extending direction with the outer ends being connected to the gear ring.

A further object of the invention is to provide a gear wheel which includes a hub and gear ring which are interconnected by a substantially triangularly-sectioned supporting structure of relatively thin-walled material.

A further object of the invention is to provide a method of forming a gear wheel which comprises separately forming a small diameter hub and a large diameter gear ring, connecting supporting plate elements to the hub at relatively widely axially spaced locations and connecting the opposite outer ends of the annular plate elements to the ring at closely axially spaced locations.

A further object of the invention is to provide a power transmission wheel construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
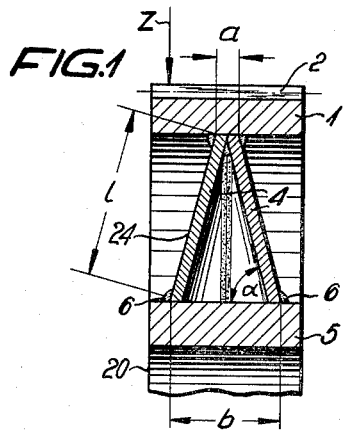
FIG. 1 is a partial cross-sectional view of a gear wheel constructed in accordance with the invention.
Figure 2:
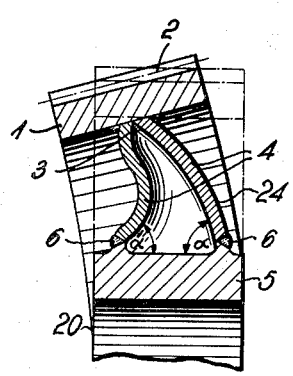
FIG. 2 is a view similar to FIG. 1 indicating the structure in an exaggerated, unbalanced stress condition.

Referring to the drawings in particular, the invention embodied therein in FIGS. 1 and 2 comprises a gear wheel generally designated 20 which includes a hub portion 5 which is joined to an outer gear ring 1 by means of a central supporting structure generally designated 24 which, in the embodiment illustrated, comprises two separate thin-walled plate elements 4. The plate elements 4 are connected to the hub 5 and the gear ring 1 at the connecting areas 6 and 3, respectively, such as by welding. The two plates 4 which form the supporting structure or web 24 of the gear wheel are arranged in a cone-like manner, converging inwardly toward their outer periphery. The orientation of the plates 4 is such that the spacing $a$ between the plates at their outer ends is made much smaller than the spacing $b$ at their inner ends.

Due to the aforementioned arranged of the supporting structure 24, the gear wheel 20 is completely stiff in an axial and radial direction. However, if a force such as a force indicated by the arrow Z acts in a radial direction at a spaced location from the center of the gear wheel, then the gear ring 1 will be able to yield or give to a certain extent. The gear ring will tilt when the yielding takes place about an imaginary temporary axis. During such tilting the hub 5, the plates 4, 4 and the gear ring 1 form a trapezoidal linkage. The connecting areas $a$ and $b$ of the ring and hub, respectively, are considered as link elements.

In FIG. 2 an exaggerated showing of the manner in which the gear ring 1 is deflected is indicated. An overloading of the tooth flanks 2 is prevented by the yieldability of the gear wheel construction and, in this manner, the contact and the carrying pitch of the teeth is significantly improved. The stiffer the connecting areas formed between the plates 4 at the location of the ring and the hub, the more elastic the plates 4 should be in order to make it possible to provide a slight tilting of the gear ring 1. When the unbalancing force occurs, the plates 4, 4 are distorted somewhat in the manner indicated in FIG. 2, and they change their original form along a bending line. The yieldability amount is determined by the length $l$ of the legs of the plates 4 and not by the angular position of the legs, as indicated by $\alpha$.

Figure 3:
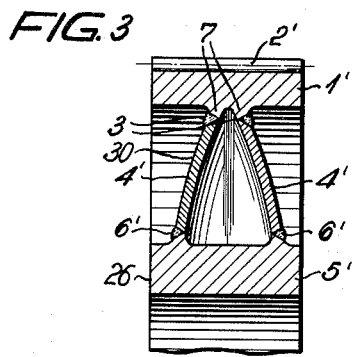
FIG. 3 is a view similar to FIG. 1 of another embodiment of the invention.
Figure 4:
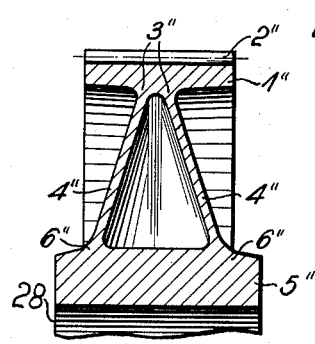
FIG. 4 is a view similar to FIG. 1 of another embodiment of the invention.

The closer the two plates 4 are moved together at the connecting area 3 to cause a reduction of the dimension $a$, the stiffer the construction with regard to axial forces. The forces which act at the gear ring can be transmitted in an excellent manner when the plates do not directly abut against each other, and such arrangements are indicated by the welded gear wheel construction generally designated 26 in FIG. 3, and by the cast gear wheel construction generally designated 28 in FIG. 4. In the construction indicated in FIG. 3, the plate elements 4', 4' forming a supporting structure or web generally designated 30 connect to depending neck elements 7, 7 formed as inward extensions of the ring 1'. In this embodiment, the plates 4', 4' are advantageously made of a curved configuration, as indicated. In FIG. 4, the gear wheel 28 is substantially similar to the gear wheel 26, with the exception that the parts are formed as an integral casting.

In the preferred method of construction, for example, for double helical gearings, it is preferable to arrange two separate gear rings in abutting side-by-side relationship and interconnect them to a common hub. Each of the gear rings is then provided with its own web which advantageously comprises plate elements of the type 4, 4 indicated in FIGS. 1 and 2.

Figure 5:
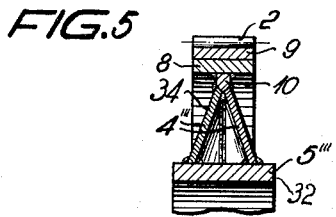
FIG. 5 is a view similar to FIG. 1 of still another embodiment of the invention.
Figure 6:
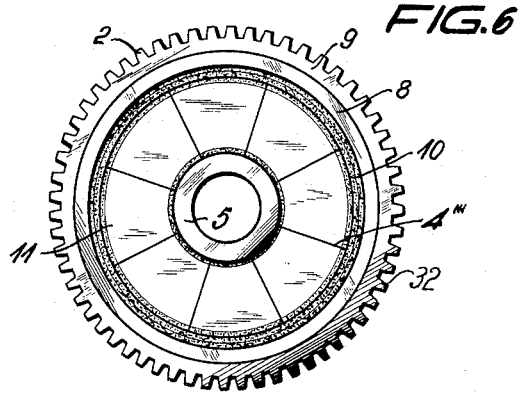
FIG. 6 is a side elevation of the total gear wheel of FIG. 5.

In FIGS. 5 and 6, there is indicated a gear wheel generally designated 32 which comprises an inner ring or rim 8 and an outer gear ring or bandage 9. The bandage 9 is advantageously heat-shrunk onto the rim 8 and the rim, in turn, is heat-shrunk onto an annular web member or web ring 10. In some instances, it is desirable to produce the rim 8 and the bandage 9 as a single piece. In this latter instance, the single piece is then shrunk onto the web 10 in the same manner as previously described and the web is then welded to the outer ring portion.

The web ring 10 forms a short common neck in which conically arranged plate elements 4''', 4''' are connected, such as by welding. Plate elements 4''', 4''' are connected to the hub 5''' in the manner of the other embodiments. In this embodiment, a supporting structure generally designated 34 is formed of the plates 4''', 4''' and the web ring 10.

In the embodiment of FIGS. 5 and 6, the plates 4''' may advantageously include segmental portions 11. This insures the most favorable utilization of materials, particularly important in the construction of large gear wheels, since it is possible to make the segments from sheet plate material. The same construction can be employed in cast gear wheels or a combination of cast and sheet metal elements which may be combined in a special manner.

Thus, the inventive construction provides a helical power transmission wheel which may be very rigid both in axial and radial directions, but still permits a certain tilting of the gear ring when a force acts on the gear ring out of the center line of the gear wheel. Due to the small radial yieldability of the tooth ring, the tooth ring is imparted with a certain adaptability to radial forces which act on only one side, and thus the entire gearing will be capable of withstanding stresses which act on one side only. In this manner the gearing adapts itself to small deviations in the tooth structure of contact areas, so that the entire tooth width will come into action in an improved manner. The contact of the teeth with gearing constructed in accordance with the invention is vastly improved over prior art structures where the tooth ring is completely rigid. Thus, tooth breakage which, prior to the present invention, occurred frequently in heavy or large gearing due to loads and stresses which occurred on one side of the gear ring are prevented.

It has been found that when the plates forming the supporting structure are arranged close together at the connection to the gear ring, the tooth gear ring becomes more flexible and may yield in an improved manner in respect to forces which act in radial direction on one side or the other of the center line of the gear wheel.

In very large gear wheel construction, it is preferable to divide the tooth ring into an inner rim portion and an outer bandage portion. Thus, even if the plates and bottoms are in inclined position due to the tilting of the bandage, sufficient rigidity of the gear wheel is secured. This applies, for example, where the plates engage directly at the tooth ring or in the instance where a short neck piece is interposed between the gear ring proper and the plates.

With the inventive construction, although it is possible to effect a tilting of the gear ring, the inclined positioning of the plates of the supporting structure insure that the overall gear structure is stiff and will absorb forces acting in an axial direction. This is also true even if the supporting plates are made relatively thin so that they have an elastic action. This elastic action may be enhanced by forming the plates in a slightly arched manner. In some instances, it may be desirable to provide ribs between the plates in order to prevent damage to the wheels, but such ribs should not extend up to the tooth ring or downwardly to the tooth hub, but only centrally therebetween, so that the adaptability of the gear wheel is maintained and so that the connecting elements permit the tilting of the gear ring as mentioned previously. The stronger the connection at the hub or at the gear ring, the more elastic must be the plate elements.

The embodiments which are shown are only a small number of the variations for helical gearings which may be constructed in accordance with the present invention. The inventive manner of construction can also be used in other transmission means besides gears where large axial forces occur and where high local overloads are encountered. Thus, for example, the invention would apply to gear wheels with arrow-shaped gear teeth, or in worm wheels, bearing blocks, pulleys, etc.

While specific embodiments of the invention have been shown and described in detail to illustrate the application of the principles of the invention, it will be understood that this invention may be embodied otherwise without departing from such principles.

What is claimed is:

1. A relatively large gear wheel wherein the gearing thereof is subjected to axial forces comprising an outer gear ring of subtantial thickness and width, a central gear hub of substantial thickness and width, and a web connecting said gear ring to said hub, said web comprising two thin plate elements connected at their inner ends to said gear hub at axially spaced locations and at their outer ends to said gear ring substantially centrally in respect to the width thereof, the spacing between the connections at the inner ends being greater than the spacing between the connection of said plates to said gear ring at their outer ends.

2. A gear wheel according to claim 1, wherein said gear wheel including said hub portion, ring portion and supporting web structure are formed as an integral casting.

3. A gear wheel according to claim 1, wherein said plate elements are made in an arched form.

4. A gear wheel according to claim 1, wherein said plate elements are made of a plurality of ring segments of sheet form.

5. A relatively large gear wheel, wherein the gearing is subjected to axial forces, comprising an outer gear ring of substantial thickness and width, a central gear hub of substantial thickness and width, and a web connecting said gear ring to said hub, said web comprising two thin plates connected at their inner ends to said gear hub at axially spaced locations and at their outer ends to said gear ring substantially centrally in respect to the width thereof, the connections being permanent rigid connections made substantially in alignment with the respective ends of each of said plates to the respective gear ring and gear hub.

6. A relatively large gear wheel, wherein the gearing is subjected to axial forces, comprising an outer gear ring of substantial thickness and width, a central gear hub of substantial thickness and width, and a web connecting said gear ring to said hub, said web comprising two thin plates connected at their inner ends to said gear hub at axially spaced locations and at their outer ends to said gear ring substantially centrally in respect to the width thereof, the connections being permanent rigid connections made substantially in alignment with the respective ends of each of said plates to the respective gear ring and gear hub, said gear ring having a radially inwardly extending connecting neck.

7. A large gear wheel body having a hub joined to a gear rim by permanent connections such as welds by two axially spaced oppositely arranged conical webs without stiffening ribs, characterized in that the said conical webs are arranged so that they form a substantially V-shaped section with the radial inner ends being widely spaced and connected to said hub at locations in alignment with the respective ends of said web and centrally in respect to the width of said rim.

8. A large gear wheel body having a hub joined to a gear rim by two spaced oppositely arranged conical webs without stiffening ribs, characterized in that the said conical webs are arranged so that they form a substantially V-shaped section with the inner ends being widely spaced and connected to said hub at locations in alignment with the respective ends of said web, said webs being joined by a permanent rigid connection directly with said gear rim and being oriented such that the radial axes thereof intersect in the range of the teeth of said gear rim and centrally in respect to the width of said rim.

9. A relatively large gear wheel, wherein the gearing is subjected to axial forces, comprising an outer gear ring of substantial thickness, a central gear hub of substantial thickness, and a web connecting said gear ring to said hub, said web comprising two thin plates connected at their inner ends to said gear hub at axially spaced locations and at their outer ends to said gear rings, the connections being permanent rigid connections made substantially in alignment with the respective ends of each of said plates to the respective gear ring and gear hub, said gear ring being formed with separate radially inwardly projecting necks extending in the same plane as each associated plate element, said plate elements being connected to said gear ring through corresponding ones of said necks.

10. A relatively large gear wheel, wherein the gearing is subjected to axial forces, comprising an outer gear ring of substantial thickness, a central gear hub of substantial thickness, and a web connecting said gear ring to said hub, said web comprising two thin plates connected at their inner ends to said gear hub at axially spaced locations and at their outer ends to said gear rings, the connections being permanent rigid connections made substantially in alignment with the respective ends of each of said plates to the respective gear ring and gear hub, said gear ring being formed of two separate outer gear ring elements secured to a common inner hub, said outer elements and said hub being connected together and to said plate elements.

11. A relatively large gear wheel wherein the gearing thereof is subjected to axial forces comprising an outer gear ring of substantial thickness, a central gear hub of substantial thickness, and a web connecting said gear ring to said hub, said web comprising two thin plate elements connected at their inner ends to said gear hub at axially spaced locations and at their outer ends to said gear ring substantially centrally in respect to the width thereof, the spacing between the connections at the inner ends being greater than the spacing between the connection of said plates to said gear ring at their outer ends, said supporting web structure including a web ring connected between said plate element and said gear ring.

References Cited by the Examiner

UNITED STATES PATENTS

| | | | |
|---|---|---|---|
| 900,700 | 10/1908 | Bole | 74—230.3 |
| 903,532 | 11/1908 | Anderson | 74—449 X |
| 1,017,152 | 2/1912 | Johnson | 74—449 X |
| 1,395,734 | 11/1921 | Root | 29—159 |
| 1,609,377 | 12/1926 | Millspaugh | 74—230.3 |
| 2,756,607 | 7/1956 | Mochel et al. | 74—449 X |

FOREIGN PATENTS

| | | |
|---|---|---|
| 138,808 | 9/1934 | Austria. |
| 1,231,448 | 4/1960 | France. |
| 373,080 | 4/1923 | Germany. |

DON A. WAITE, *Primary Examiner.*